United States Patent [19]

Moczygemba et al.

[11] 4,158,654

[45] Jun. 19, 1979

[54] CARBOXYLIC ACID IN ALKALI METAL CARBOXYLATE RUBBER SOLUTION

[75] Inventors: George A. Moczygemba; Aubrey South, Jr., both of Bartlesville, Okla.

[73] Assignee: Phillips Petroleum Company, Bartlesville, Okla.

[21] Appl. No.: 888,068

[22] Filed: Mar. 20, 1978

[51] Int. Cl.$^2$ .......................... C08K 7/14; C08L 67/06
[52] U.S. Cl. .................................. 260/40 R; 260/862
[58] Field of Search .............................. 260/40 R, 862

[56] References Cited

U.S. PATENT DOCUMENTS

| | | | |
|---|---|---|---|
| 3,219,619 | 11/1965 | Dickerson | 260/33.6 |
| 3,227,701 | 1/1966 | Pennington | 260/94.7 |
| 3,925,272 | 12/1975 | Ibata et al. | 260/4 |
| 3,976,628 | 8/1976 | Halasa et al. | 260/880 B X |
| 4,020,036 | 4/1977 | South | 260/40 R |

*Primary Examiner*—Sandra M. Person

[57] ABSTRACT

A mixture of a carboxylic acid and an alkali metal carboxylate-containing rubber in a vinyl monomer is provided. The resulting composition has a relatively low viscosity and is particularly adapted for preparing a thermosettable composition suitable for preparing reinforced plastic articles by combining an unsaturated polyester, the alkali metal carboxylate-containing rubber solution containing the carboxylic acid, a catalyst, and a reinforcing agent. The resulting composition when cured exhibits high impact strength and good surface finish.

23 Claims, No Drawings

4,158,654

CARBOXYLIC ACID IN ALKALI METAL CARBOXYLATE RUBBER SOLUTION

BACKGROUND OF THE INVENTION

It is known in the art to modify unsaturated polyesters with rubber. However, it has been found that such compositions tend to exhibit separation when combined with a reinforcing agent or filler, thus impairing the physical properties, particularly impact strength. This separation is apparently the result of poor compatibility between the rubber and the unsaturated polyester.

Recently it has been demonstrated that this compatibility problem can be at least partially overcome by modifying the rubber to include a polar carboxyl group. However, the methods for producing the carboxy-containing rubber often result in the presence of a minor to a major proportion of alkali metal carboxylate-containing rubber as an impurity, said impurity arising from the incomplete neutralization of the alkali metal carboxylate obtained from the reaction of carbon dioxide with alkali metal-terminated polymer (living polymer). Alkali metal carboxylate-containing polymers as modifiers for unsaturated polyesters also exhibit good compatibility with the polyester and provide good, indeed outstanding physical properties. However, they suffer one major deficiency in that the viscosity of solutions of these alkali metal carboxylate-containing polymers is too high.

SUMMARY OF THE INVENTION

It is an object of this invention to provide a low viscosity solution of an alkali metal carboxylate-containing rubber in a vinyl monomer;

it is another object of this invention to produce a thermosetting polyester composition utilizing an alkali metal carboxylate-containing rubber;

it is a further object of this invention to provide a thermosetting polyester composition having good impact strength and good surface characteristics; and it is still yet a further object of this invention to provide an improved method for producing polyester compositions utilizing a normally solid alkali metal carboxylate-containing rubber.

In accordance with this invention, a carboxylic acid is used to reduce the viscosity of a solution of a normally solid alkali metal carboxylate containing rubber.

DESCRIPTION OF THE PREFERRED EMBODIMENTS

It has been found, surprisingly, that the presence of a carboxylic acid in a vinyl monomer solution of an alkali metal carboxylate-containing polymer unexpectedly causes the solution viscosity to be relatively low. The carboxylic acid can be added either to an already prepared viscous solution of the alkali metal carboxylate-containing polymer or the carboxylic acid can be blended with the alkali metal carboxylate-containing polymer prior to preparing the vinyl monomer solution.

This invention relates to unsaturated polyester compositions having good impact strength and good surface characteristics. In particular, this invention relates to a composition comprising: (1) an unsaturated polyester, (2) a normally solid alkali metal carboxylate-containing rubber, (3) a carboxylic acid, (4) a vinyl monomer, and (5) a catalyst. Furthermore this invention pertains to a composition comprising a solution of a normally solid alkali metal carboxylate-containing rubber and a carboxylic acid in a vinyl monomer solvent, said solution unexpectedly having a lower solution viscosity than a similar solution without the carboxylic acid.

The unsaturated polyesters are prepared by reacting an unsaturated dicarboxylic acid having 4 to 12 carbon atoms such as maleic, fumaric, itaconic, citraconic, mesaconic (or anhydrides or acid halides thereof), cis-2-dodecenedioc acid and mixtures thereof with one or more polyols. Representative polyols that can be used include alkylene glycols having 2-10 carbon atoms, dialkylene glycols having 4-18 carbon atoms, glycerol, pentaerythritol, trimethylolpropane, trimethylpentanediol, trimethylpropanediol and hydrogenated bisphenol-A.

Up to one-half or more on a molar ratio of the unsaturated acid can be replaced by one or more saturated polycarboxylic acids having from 2-12 carbon atoms to modify the degree of unsaturation and reactivity of the polyester. Illustrative of these are oxalic acid, malonic acid, succinic acid, methylsuccinic acid, glutaric acid, adipic acid, suberic acid, sebacic acid, the phthalic acids, naphthalene dicarboxylic acid, cyclohexane dicarboxylic acid citric acid and the like and mixtures thereof.

The proportion of polyhydric alcohols having more than two hydroxy groups such as glycerol, pentaerythritol, etc. and the proportion of polycarboxylic acids having more than two carboxy groups such as citric acid is preferably less than about 5 mole percent each based on total amount of polyol and polycarboxylic acid respectively so that a polyester is obtained with maximum esterification of the hydroxy and carboxy groups without being so viscous that difficulty would be experienced during subsequent compounding.

The normally solid alkali metal carboxylate-containing rubbers used in this invention are derivatives of the conjugated diene polymers prepared by organo alkali metal-initiated solution polymerization techniques well known in the art. Specifically, the polymers can be prepared by contacting the monomer or monomers with an organo alkali metal compound. Compounds containing only one alkali metal atom per molecule, such as n-butyllithium, are suitable and will produce mono-terminally reactive polymer, that is, polymer containing a reactive alkali metal group on only one end of the polymer chain. In addition, an organo polyalkali metal compound can be employed, for example, containing 2 to 4 alkali metal atoms, leading to the formation of telechelic reactive polymer. The living polymers produced by these procedures and which contain one or more alkali metal atoms are treated with a carboxylation agent such as carbon dioxide. The resulting alkali metal carboxylate-terminated conjugated diene polymers can be isolated from the polymerization solution by typical coagulation and recovery procedures. The alkali metal terminated polymers herein described may be reacted with a polyvinyl aromatic compound, such as for example, divinylbenzene, to effect a coupling reaction prior to contacting with a carboxylation agent. Whereas any organo alkali metal compound can be used for the formation of alkali metal terminated polymers, lithium is the preferred alkali metal.

Another method of producing said alkali metal carboxylate-containing polymers for use in this invention is by metalation of a preformed polymer using such as n-butyllithium in the presence of a tertiary amine such as tetramethylethylenediamine, followed by carboxylation of the lithiated polymer. This metalation procedure is well known in the art and is specifically taught by U.S. Pat. No. 3,976,628. These rubbers have alkali metal carboxylate groups essentially randomly distributed along the backbone of the molecules thereof, in contrast to the alkali metal carboxylate-terminated polymers obtained by the procedure described earlier. The number of backbone alkali metal carboxylates is regulated by the amounts of reagents used and the reaction conditions employed. These are readily determined by one skilled in the art.

Alternatively, the alkali metal carboxylate containing polymers can be produced by reaction of a carboxy-containing polymer with a material such as an alkali metal hydroxide, alkoxide, aryloxide, or organo compound. Said carboxy-containing polymers may be prepared by neutralizing the earlier described alkali metal carboxylate-containing polymers, for instance, with a mineral acid. Alternately they can be prepared by free radical polymerization in solution, suspension or emulsion processes. For example, polymerization can be initiated with carboxy-containing compounds such as 4,4'-azobis(4-cyanovaleric acid), di($\beta$-carboxypropionyl) peroxide (succinic acid peroxide) and the like. Chain transfer agents such as thioglycolic acid and the like are used to regulate the molecular weight of the polymer produced in such processes. Furthermore, the carboxy-containing polymers of conjugated dienes can be prepared by reacting polymers such as hydroxy terminated polymers with an anhydride of an unsaturated dicarboxylic acid such as maleic anhydride, titraconic anhydride, itaconic anhydride, chloromaleic anhydride and the like to produce polymers with attached groups terminated with a carboxy group. Other carboxy containing diene polymers can be prepared in emulsion systems incorporating reactive unsaturated carboxylic acid monomers. Also diene polymers can be modified with peroxide and unsaturated reactive carboxylic acids or thio containing carboxylic acids to give carboxy containing polymers.

The resulting alkali metal carboxylate-containing polymers generally have an alkali metal carboxylate content in the range of about 0.01 to 6, preferably 0.01 to 1 weight percent based on the total weight of the alkali metal carboxylate-containing polymer. The polymers of conjugated dienes for use in this invention are normally solid, having a weight average molecular weight of 1,000 to 400,000 or higher, preferably however 50,000 to 250,000.

The diene addition in the polymers of conjugated dienes can be used in the 1, 2-mode or the 1, 4-mode (cis or trans) or combinations thereof. The unsaturation microstructure of the polymers is generally in the range of from about 5 to 76 percent vinyl, from about 5 to 60 percent trans and from about 15 to 50 percent cis unsaturation.

The diene polymers of this invention include the homopolymers and copolymers of the conjugated dienes. Also included are copolymers of the conjugated dienes and a monovinyl-substituted aromatic hydrocarbon containing from about 8-20 carbon atoms per molecule. Examples of the monovinyl-substituted aromatic monomer include: styrene, 3-methylstyrene, 4-n-propylstyrene, 4-cyclohexylstyrene, 4-dodecylstyrene, 2-ethyl-4-benzylstyrene, 4-(4-phenyl-n-butyl) styrene, 1-vinylnaphthalene, 2-vinylnaphthalene, t-butylstyrene and the like. The monovinyl-substituted aromatic hydrocarbon can contain alkyl, cycloalkyl, and aryl substituents, and combinations thereof such as alkylaryl in which the total number of carbon atoms in the combined substitutents is generally not greater than 12. Styrene is presently preferred because of its availability and effectiveness. The polymerized conjugated diene content of the polymers of this invention ranges from about 20 to 100 weight percent, more preferably from about 55 to 100 weight percent.

Although the presently preferred conjugated diene is 1,3-butadiene, it is within the scope of the alkali metal carboxylate-containing polymers of this invention to use conjugated dienes containing from 4–12 carbon atoms per molecule, more preferably from 4–8 carbon atoms per molecule. Examples of such compounds include 1,3-butadiene, isoprene, 2,3-dimethyl-1,3-butadiene, piperylene, 3-butyl-1,3-octadiene, 1-phenyl-1,3-butadiene, and the like and mixtures thereof.

The conjugated diene-monovinyl-substituted aromatic hydrocarbon copolymers can be of random or block configuration or combinations thereof. Block polymers are presently preferred.

The weight ratio of unsaturated polyester to alkali metal carboxylate-containing polymer generally ranges from about 20:1 to 0.5:1, preferably from about 5:1 to 1:1.

The carboxylic acids suitable for use in this invention are the saturated and unsaturated aliphatic, alicyclic, aromatic, and heterocyclic mono-, di- and higher carboxylic acids, and substituted derivatives thereof. Especially preferred, although not intended to be limiting, are the mono-carboxylic acids having from about 2 to about 20 carbon atoms per molecule, such as for example acetic acid, methacrylic acid, benzoic acid, capric acid, lauric acid, myristic acid, palmitic acid, elaidic acid, stearic acid, and arachidic acid.

Preferably and ideally the amount of carboxylic acid to add is such that at least one equivalent weight of acid is added for each equivalent weight of alkali metal carboxylate group present in the total amount of modifying rubber employed in the blend. It is within the scope of this invention to add excess carboxylic acid although the amount added will not normally exceed about five equivalents by weight of carboxylic acid per one equivalent by weight of alkali metal carboxylic group in the modifying polymer, more preferably no more than about two equivalents by weight of carboxylic acid per one equivalent by weight of alkali metal carboxylate group in the modifying polymer. Excess carboxylic acid may influence solution viscosity. It is also within the scope of this invention to use less than one equivalent by weight of carboxylic acid per one equivalent by weight of alkali metal carboxylate group. This may result in less than the maximum decrease in styrene solution viscosity or less than the maximum attainable level of certain physical properties of the modified polyester which could be obtained when one equivalent or more by weight of carboxylic acid is added per one equivalent by weight of alkali metal carboxylate group. However, this may be desirable for specific end-use requirements. Thus generally from 0.1 to 1 equivalents will be used.

Representative vinyl monomers include styrene, vinyltoluene, divinylbenzene, 2-vinylpyridine, diallyl phthalate, triallyl isocyanurate, $\alpha$-methylstyrene, alkyl acrylates and alkyl methacrylates in which the carbon atoms in the alkyl groups range from 1 to about 6 and the like and mixtures thereof. The presently preferred vinyl monomer is styrene because of its availability, reactivity, cost and desirable properties. Total vinyl monomer from all sources is 15 to 300, preferably 30 to 200 parts by weight vinyl monomer per 100 parts by weight polyester plus alkali metal carboxylate-containing polymer. In the vinyl monomer solution of the alkali metal carboxylate-containing rubber, the polymer is generally present in an amount within the range of 10 to 50, preferably 20 to 40, more preferably about 30 weight percent based on the total weight of rubber and monomer. This may constitute all of the vinyl monomer used, or additional vinyl monomer may be added when the other ingredients are added.

The catalysts used in this invention are conventional free radical polymerization initiators selected from among organic peroxides and hydroperoxides such as benzoyl peroxide, dicumyl peroxide, methyl ethyl ketone peroxides, lauryl peroxide, cyclohexanone peroxides, t-butyl perbenzoate, t-butyl hydroperoxide, α-cumyl hydroperoxide, t-butyl peroctoate and the like. In addition, azo compounds such as azobisisobutyronitrile can be employed. A presently preferred catalyst is t-butyl perbenzoate. The catalyst is generally used in the range from about 0.1 to 10 parts by weight per 100 parts by weight polyester plus alkali metal carboxylate-containing rubber, more preferably from about 0.5–5 parts by weight catalyst.

In addition to the previously named components of the compositions of this invention, other optional additives can be used. These include fillers, reinforcing agents, thickeners, lubricants, stabilizers, colorants and pigments, silane coupling agents and the like.

Fillers include calcium carbonate, calcium silicate, talc, clay, alumina, aluminum hydroxide, antimony trioxide, silica, mica, barium sulfate, calcium sulfate, and the like and mixtures thereof. Presently preferred fillers include calcium carbonate, aluminum hydroxide, clay and talc because of availability, flame retardancy and cost. The quantity of filler, when used, is generally used in the range of from about 50 to 1000 parts by weight polyester plus alkali metal carboxylate-containing rubber, more preferably from about 200 to 800 parts by weight filler.

The reinforcing agents used in this invention comprise fibers selected from among glass, asbestos, carbon, graphite, metal, synthetic polymers, such as polyamides, polyesters, polyolefins and the like and natural fibers such as cotton, jute, hemp, sisal, flax, wood, paper and the like. A presently preferred fiber is glass. The fibers can be used in the form of mats, fabrics, threads, roving, chopped fiber and the like. The quantity of reinforcing agent used is generally in the range of from about 20 to 300 parts by weight per 100 parts by weight polyester plus alkali metal carboxylate-containing rubber, more preferably from about 40 to 200 parts by weight of reinforcing agent.

Desirably, from about 0.2 to 20 parts by weight, preferably from about 1 to 10 parts by weight per 100 parts by weight of polyester plus alkali metal carboxylate-containing polymer of an oxide or hydroxide of a Group II metal are added to the compositions of this invention. Exemplary of such compounds are the oxides and hydroxide of magnesium, calcium, strontium, barium and zinc. The compounds provide a thickening function.

A lubricant such as aluminum, barium, calcium, magnesium or zinc stearate and the like in the range of about 0.2 to 20 parts by weight, more preferably from about 1 to 15 parts by weight per 100 parts by weight alkali metal carboxylate-containing rubber plus polyester can be used to impart mold release properties to the compositions.

A stabilizer such as a barium or cadmium soap, a tin compound such as tin octanoate, a phosphite such as dimethyl phosphite, tris(nonylphenyl) phosphite alkyl phenols such as BHT, quinones, amines, and the like can be employed in an amount ranging from about 0.02 to 5 parts by weight per 100 parts by weight polyester plus alkali metal carboxylate-containing rubber.

Conventional colorants and pigments such as $TiO_2$, carbon black, phthalocyanine pigments and the like, and mixtures thereof, are employed as desired in amounts sufficient to give the desired color and to the final molded product.

Generally, the compositions are made up of ingredients consisting essentially of the polyester, the rubber, the carboxylic acid, the vinyl monomer, the catalyst, the reinforcing agent, the lubricant, the thickener, and the filler. This, of course, does not exclude the presence of conventional additives such as antioxidants, UV stabilizers, pigments and the like as described above.

The preferred mixing procedure is as follows. The alkali metal carboxylate-containing polymer and the carboxylic acid are dissolved in the vinyl monomer to give a solution. A portion of a filler, if used, is mixed with this solution. Then a premixed mixture of polyester resin, lubricant, if used, and catalyst is added. The remaining filler, if used, is mixed in and then the thickener, if used, is added. Finally after the mixing of these ingredients is complete, the reinforcing agent, if used, is added. The ingredients are incorporated by a mixing technique which involves moderate shear. This can be accomplished by means of twin-rotor mixers designed to give moderate shear to the paste-like ingredients.

As an alternative mixing procedure, a paste-like mixture can be made by using a high speed impeller mixer. The paste is made by combining the alkali metal carboxylate-containing polymer, carboxylic acid, and vinyl monomer to form a solution which is mixed with the polyester resin, lubricant, if used, catalyst and filler, if used. A thickener, if used, may be added to the paste at this point. The amount of filler mixed in the paste depends upon desired viscosity of the paste and end-use application of the final composite. The paste is charged to a mixer such as a twin-rotor mixer and mixed with additional filler, if desired. A thickener may be added, if desired, if such has not been added to the paste previously. Finally after the mixing of these ingredients is complete, the reinforcing agent, if used, is added. Sheet molding compounds can also be made by using mixing equipment and sheet molding compound machinery well known to those skilled in the art. Mixing after sufficient shear and mixing time to achieve good dispersion of the ingredients insures a good blend. However, heat buildup during mixing should be sufficiently low to prevent activating the catalyst. The maximum temperature is determined by the curing system (catalyst) which is used. Shear which gives a heat buildup of 1°–50° C., preferably 2°–30° C. is satisfactory.

The curing can be done at a temperature known in the art for the particular catalyst utilized. Generally a temperature of 100° to 200° C. and a time of 1 to 15 minutes in a press is sufficient.

EXAMPLE I

This example illustrates the improvement in surface roughness, gloss, and reverse impact strength which is obtained by adding to an unsaturated polyester resin a 70/30 butadiene-styrene linear diblock copolymer having one terminal lithium carboxylate group attached to the butadiene block.

ter than is a similar 70/30 butadiene-styrene diblock copolymer which contains no carboxylate or carboxyl terminal group.

Table I
Physical Properties of Rubber Modified Unsaturated Polyester Thermosetting Compositions[a]

| Modifying Rubber[b] | | | | Rubber Modified Unsaturated Polyester Composition | | |
|---|---|---|---|---|---|---|
| | Molecular Weight[c] | | Inherent | Average Roughness,[e] | Gloss % at | Reverse Impact, |
| Type | $M_w$ | $M_n$ | Viscosity[d] | Microns | 60° Angle[f] | Inches[g] |
| Styrene-Butadiene | 128,000 | 113,000 | 1.12 | 0.45 | 19 | <3.5 |
| Styrene-butadiene-COOLi | 79,000 | 71,000 | 0.92 | 0.60 | 35 | 6 |
| Styrene-butadiene-COOLi | 93,000 | 83,000 | 0.97 | 0.35 | 39 | 8 |
| Styrene-butadiene-COOLi | 124,000 | 109,000 | 1.08 | 0.30 | 49 | 8 |
| Styrene-butadiene-COOLi | 161,000 | 138,000 | 1.25 | 0.25 | 83 | 11–12 |
| Styrene-butadiene-COOH | 84,000 | 74,000 | 0.78 | 0.45 | 37 | 7–8 |
| Styrene-butadiene-COOH | 102,000 | 87,000 | 0.93 | 0.40 | 62 | 9–10 |
| Styrene-butadiene-COOH | 122,000 | 105,000 | 1.01 | 0.35 | 79 | 6 |
| Styrene-butadiene-COOH | 154,000 | 125,000 | 1.21 | 0.25 | 72 | 14 |

[a]Prepared according to Recipe 1.
[b]70/30 Butadiene-styrene diblock copolymers having about 10% of butadiene polymerized via 1, 2-mode to givevinyl groups.
[c]Determined using a gel permeation chromatography method as described in G. Kraus and C. J. Stacy, J. Poly. Sci. A-2 10, 657–672 (1972), and G. Kraus and C. J. Stacy, J. Poly. Sci.:Symposium No. 43, 329–343 (1973).
[d]Determined according to the procedure given in U.S. Pat. 3,278,508, column 20. Note a with the modification that the solution was not filtered through a sulfur absorption tube but rather a sample of the solution was filtered through a fritted glass filter stick of grade C porosity and pressured directly into the viscometer.
[e]Average roughness, height in microns, was measured using a Bendix Profilometer, Type QBA, LX-6 tracer, F. T. Skidmount.
[f]ASTM D 523–67.
[g]Reverse impact, height in inches, was determined by dropping a 0.6 lb. (277g) dart with rounded tip on a plaque with a 5 inch diameter unsupported area. Failure is defined as the appearance of a crack or cracks on the reverse side of the plaque and the minimum height in inches from which the dart was dropped to cause these cracks is recorded as the reverse impact strength.

Rubber modified unsaturated polyester thermosetting compositions were prepared according to Recipe I.

Recipe I
Formulation for Rubber Modified Unsaturated Polyester Thermosetting Composition

| Ingredient | Parts by Weight |
|---|---|
| Polyester resin[a] | 11.8 –13.6[b] |
| Rubber Solution (30–35% solids in styrene) | 10.4 –13.0[b] |
| Calcium carbonate | 60.3 ±0.5 |
| Zinc stearate | 0.7 |
| Magnesium hydroxide | 0.4 |
| t-Butyl perbenzoate | 0.2 |
| ¼ inch Glass fiber | 14.2 ±0.2 |

[a]3702-5, Koppers Co., Inc. A resin (approximately 60% solids in styrene) from a 0.9:1 mole ratio of fumaric acid:propylene glycol with some maleic acid units as indicated by nuclear magnetic resonance analysis.
[b]Total polyester resin solution plus rubber solution was 24±1 parts by weight.

Each composition was prepared by mixing a solution of the rubber dissolved in styrene with about ½ of the calcium carbonate filler in a Baker-Perkins mixer using sigma blades for 5 minutes. A mixture of the polyester resin dissolved in styrene, zinc stearate mold release agent, and t-butyl perbenzoate catalyst, all of which had been premixed, was then added and mixed for 5 minutes. The remaining calcium carbonate was then added and mixing continued for an additional 5 minutes. Magnesium hydroxide, thickener was added and mixed for 5 minutes and the chopped fiber glass reinforcing agent was added in two increments to the mixture and mixing was continued an additional 5 minutes. Plaques measuring 6 inches × 6 inches × 0.15 inches (15.2 cm × 15.2 cm × 0.38 cm), were compression molded from each composition for 5 minutes at 300° F. (149° C.) and 40,000 psig (276 MPa gauge). Each plaque was then evaluated to determine its physical properties.

The data in Table I illustrate that lithium carboxylate-terminated butadiene-styrene diblock copolymer and carboxy-terminated butadiene-styrene diblock copolymer are more effective modifiers of unsaturated polyes-

EXAMPLE II

This example illustrates the reduction in solution viscosity which is obtained on adding stearic acid to a styrene solution of lithium carboxylate-terminated butadiene-styrene diblock copolymer.

The solution viscosity of styrene solutions (30 weight percent solids) of carboxy- and carboxylate-terminated 70/30 butadiene-styrene diblock copolymers was determined using a Brookfield viscometer as described in Table II, Footnote (b) before and after adding 0.5 phr stearic acid (parts per hundred parts of rubber) to the styrene solution. Data in Table II illustrate the higher solution viscosity of styrene solutions of lithium carboxylate-terminated polymers compared to carboxy-terminated polymers. Furthermore, it illustrates the reduction in viscosity which occurs on addition of stearic acid to styrene solutions of the lithium carboxylate-terminated polymer. No reduction in solution viscosity occurred on adding stearic acid to solutions of carboxy-terminated polymer.

Table II

| Styrene Solution Viscosities of Rubber Modifiers | | | | |
|---|---|---|---|---|
| Modifying Rubber[a] | | | Stearic | Vis- |
| | Molecular Weight | | Acid, | cosity, |
| Type | $M_w$ | $M_n$ | phr | mPa·s [b] |
| Styrene-butadiene-COOH | 109,000 | 94,000 | none | 27,350 |
| Styrene-butadiene-COOLi | 105,000 | 93,000 | none | 150,800 |
| Styrene-butadiene-COOLi | 109,000 | 94,000 | 0.5 | 30,850 |
| Styrene-butadiene-COOLi | 59,000 | 53,000 | none | 16,000 |
| Styrene-butadiene-COOLi | 59,000 | 53,000 | 0.5 | 3,140 |
| Styrene-butadiene-COOH | 92,000 | 80,000 | none | 9,450 |
| Styrene-butadiene-COOLi | 85,000 | 75,000 | none | 53,200 |

Table II-continued

| Styrene Solution Viscosities of Rubber Modifiers | | | | |
|---|---|---|---|---|
| Modifying Rubber[a] | | | Stearic Acid, phr | Viscosity, mPa·s [b] |
| Type | Molecular Weight | | | |
|  | $M_w$ | $M_n$ | | |
| Styrene-butadiene-COOH | 92,000 | 80,000 | 0.5 | 10,000 |

[a] 70/30 Butadiene-styrene diblock copolymers.
[b] Determined for a 30 weight percent solids solution in styrene using a Brookfield visometer, Model RVF, at 25° C. and 20 rpm and using spindle no. 4 for viscosities below about 10,000, spindle no. 5 for viscosities between about 10,000 and 20,000, spindle no. 6 for viscosities between about 20,000 and 30,000, and spindle no. 7 for viscosities above about 30,000.

EXAMPLE III

This example illustrates the effect of adding varying levels of stearic acid on the solution viscosity of a styrene solution of lithium carboxylate-terminated butadiene-styrene diblock copolymer.

Three levels of stearic acid were added to a 30 weight percent solids styrene solution of a 70/30 butadiene-styrene diblock copolymer having essentially one terminal carboxyl or carboxylate functional group per polymer chain.

Analysis by a titration method indicated that about 80% of the copolymer had terminal lithium-carboxylate functional groups and about 20% of the copolymer had carboxyl terminal groups, the neutralization step in the preparation of the carboxy-terminated polymer obviously being incomplete. The data in Table III illustrate the difference in Table III

| Solution Viscosity as a Function of Amount of Stearic Acid Added | |
|---|---|
| Stearic Acid, phr | Viscosity, mPa·s [a] |
| none | 115,000 |
| 0.25 | 49,000 |
| 0.5 | 33,000 |
| 1.0 | 30,000 |

[a] Determined using a Brookfield viscometer, Model HBT with a number 2 spindle operating at 5 rpm (2.5 rpm for viscosities over 100,000 mPa·s) and at a temperature of 24° C. 30 weight percent solids styrene solution of a 70/30 butadiene-styrene diblock copolymer having a $M_w/M_n$ = 150,000/108,000 and containing one terminal carboxyl- or lithium carboxylate-group per polymer chain was used for evaluation.

solution viscosity of these three solutions, the solution viscosity decreasing with the addition of higher levels of stearic acid. This would imply that under the conditions employed for this experiment, 0.5 phr of stearic acid was almost but not quite sufficient to completely counteract the viscosity increasing properties of the lithium carboxylate groups in the polymer sample. The data would appear to indicate that even a slightly lower viscosity might be achieved if greater than 1.0 phr stearic acid were to be added. However, 0.25 phr stearic acid, which is about 1 equivalent weight of acid per equivalent of lithium carboxylate, decreased the viscosity to a level of less than one-half the initial viscosity. It is believed some reduction in viscosity occurs on the initial addition of the acid and hence depending on the amount of reduction desired, about 0.1 to 1 equivalent weight of the acid will generally be used although as noted hereinbefore an excess can be added, if desired.

EXAMPLE IV

This example illustrates the improvement in reverse impact strength which occurs when stearic or methacrylic acid is added to the thermosetting composition which is modified with a lithium carboxylate-terminated copolymer.

Thermosetting compositions were prepared according to Recipe I with the modification that 1 phr of stearic or methacrylic acid was added as an additional ingredient except for the control run. The modifying rubber employed was the same polymer used and described in Example III.

Data in Table IV illustrate the improvement in reverse impact strength which is realized by the addition of carboxylic acid to the compositions.

Table IV

| Reverse Impact Strength of Unsaturated Polyester Thermosetting Compositions Containing Blend of Lithium Carboxylate-terminated Polymer[a] and Carboxylic Acid | | |
|---|---|---|
| Carboxylic Acid, phr | Viscosity, mPa·s[b] | Reverse Impact, Inches |
| None | 115,000 | 6 |
| Methacrylic, 1 | 29,000 | 9 |
| Stearic, 1 | 30,000 | 11 |

[a] 70/30 Butadiene-styrene diblock copolymer wherein about 80 percent of the copolymer molecules have terminal lithium-carboxylate functional groups and about 20 percent have carboxyl terminal groups, and the copolymer having a number average molecular weight of 108,000.
[b] Styrene solution viscosity at 30 weight percent solids content as determined using a Brookfield viscometer as described in Table III, Footnote a).

While this invention has been decribed in detail for the purpose of illustration, it is not to be construed as limited thereby but is intended to cover all changes and modifications within the spirit and scope thereof.

We claim:
1. A composition resulting from mixing ingredients comprising
   (a) an unsaturated polyester prepared by reacting an unsaturated dicarboxylic acid and a polyol;
   (b) a normally solid alkali metal carboxylate-containing rubber;
   (c) a carboxylic acid;
   (d) a vinyl monomer;
   (e) a catalyst; and
   (f) a reinforcing agent.
2. A composition according to claim 1 wherein said rubber of (b) contains from 0.01 to 1 weight percent alkali metal carboxylate based on the total weight of said alkali metal carboxylate-containing rubber.
3. A composition according to claim 1 wherein said alkali metal is lithium and said rubber is a copolymer of a conjugated diene and a monovinyl-substituted aromatic compound.
4. A composition according to claim 3 wherein said rubber is prepared by contacting at least one monomer with an organo alkali metal compound and thereafter treating with carbon dioxide.
5. A composition according to claim 4 wherein said rubber is a copolymer of butadiene and styrene having a weight average molecular weight within the range of 50,000 to 250,000, said polyester is prepared by reacting fumaric acid and propylene glycol, said vinyl monomer is styrene, said catalyst is a peroxide, and wherein a ratio of (a) to (b) is within the range of 5:1 to 1:1 and wherein said vinyl monomer is present in an amount within the range of 30 to 200 parts by weight per 100 parts by weight of (a) plus (b).
6. A composition according to claim 5 wherein said reinforcing agent is glass fibers, said catalyst is tertiary butyl perbenzoate and wherein said composition contains in addition calcium carbonate, zinc stearate, and magnesium hydroxide.

7. A cured article produced by subjecting the composition of claim 6 to heat.

8. A cured article produced by subjecting the composition of claim 1 to heat.

9. A composition according to claim 1 wherein said rubber contains metal carboxylate groups distributed essentially randomly along the backbone of the molecules thereof.

10. A composition made up of ingredients consisting essentially of:
(a) an unsaturated polyester prepared by reacting an unsaturated dicarboxylic acid and a polyol;
(b) a normally solid alkali metal carboxylate-containing rubber;
(c) a carboxylic acid;
(d) a vinyl monomer;
(e) a catalyst;
(f) a fibrous reinforcing agent;
(g) a lubricant;
(h) a thickener; and
(i) a filler.

11. A composition according to claim 10 wherein said lubricant is one of aluminum, barium, calcium, magnesium or zinc stearate, and wherein said thickener is selected from oxides and hydroxides of magnesium, calcium, strontium, barium, and zinc.

12. A method of forming compositions suitable for preparing reinforced plastic articles comprising mixing together under conditions of moderate shear;
(a) an unsatuated polyester prepared by reacting an unsaturated dicarboxylic acid and a polyol;
(b) a normally solid alkali metal carboxylate-containing rubber;
(c) a carboxylic acid;
(d) a vinyl monomer;
(e) a catalyst; and
(f) a reinforcing agent;

13. A method according to claim 12 wherein said mixing is done with a twin-rotor mixer using sigma blades.

14. A method according to claim 12 wherein said shear produces a temperature rise of 2°-30° C.

15. A method according to claim 12 wherein the resulting composition is subjected to curing conditions of 100° to 200° C. for a time within the range of 1-15 minutes.

16. A method according to claim 12 wherein said unsaturated polyester is produced by reacting fumaric acid and propylene glycol, said normally solid alkali metal carboxylate-containing rubber is provide by contacting 1,3-butadiene and styrene monomers with n-butyllithium, said vinyl monomer is styrene present in an amount within the range of 30 to 200 parts by weight per 100 parts by weight of (a) plus (b), said catalyst is tertiary butyl perbenzoate, said filler is calcium carbonate present in an amount within the range of 200 to 800 parts by weight of filler per 100 parts by weight of (a) plus (b), said lubricant is zinc stearate, said thickening agent is magnesium hydroxide and said reinforcing agent is glass fibers present in an amount within the range of 40 to 200 parts by weight per 100 parts by weight of (a) plus (b).

17. A composition formed by mixing ingredients comprising:
(a) a normally solid alkali metal carboxylate-containing rubber;
(b) a carboxylic acid; and
(c) a vinyl monomer.

18. A composition according to claim 17 wherein said rubber is a copolymer of styrene and butadiene produced with an n-butyllithium initiator followed by treatment with carbon dioxide, said carboxylic acid is selected from acetic acid methacrylic acid, benzoic acid, capric acid, lauric acid, myristic acid, palimitic acid, elaidic acid, stearic acid, and arachidic acid, and said vinyl monomer is styrene.

19. A composition according to claim 17 wherein said acid is selected from methacrylic acid and stearic acid and wherein said rubber is present in an amount of about 30 weight percent.

20. A composition according to claim 1 wherein the carboxylic acid is stearic acid.

21. A composition according to claim 4 wherein the carboxylic acid is stearic acid.

22. A method according to claim 12 wherein the carboxylic acid is stearic acid.

23. A composition according to claim 17 wherein the carboxylic acid is stearic acid.

* * * * *